3,579,519
CRYSTALLINE FORM OF QUINACRIDONE
Hans R. Schweizer, Herrliberg, Switzerland, assignor to Eastman Kodak Company, Rochester, N.Y.
Filed Sept. 8, 1966, Ser. No. 577,932
Int. Cl. C07d 37/18
U.S. Cl. 260—279     5 Claims

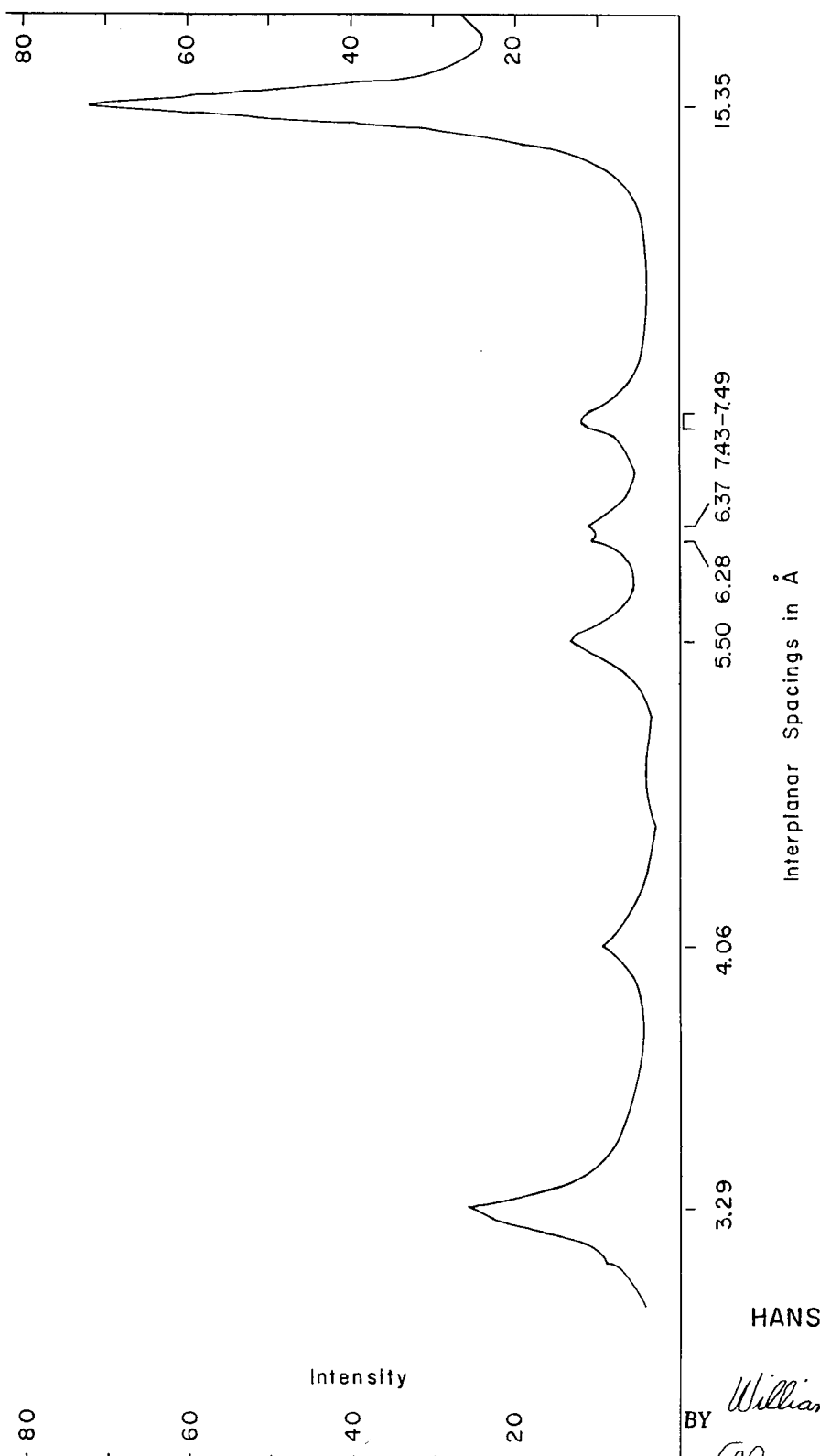

ABSTRACT OF THE DISCLOSURE

An improved quinacridone having good light fastness, a more-reddish shade with high tinctorial power and a soft texture is prepared by a process which comprises dissolving quinacridone prepared by known methods in hot hexamethyl phosphoramide at a temperature above 100° C. The solution is then poured into a cold non-solvent such as methanol. The precipitated quinacridone is subsequently separated from the mixture. Quinacridone prepared by the described procedure is useful as a pigment for coloring dopes and melts in the manufacture of molded objects, fibers, films, etc.

---

The present invention relates to a new quinacridone pigment and its method of preparation.

Quinacridone is 5,12-dihydroquino-(2,3-b)-acridine-7,14-dione and has the following formula:

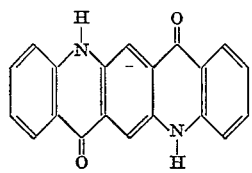

Various methods for the preparation of quinacridone are known. Furthermore there have been various attempts to produce crystalline forms of quinacridone of different shades of red violet colour and different textures. For instance so-called α-, β- and γ-forms have been described in U.S. 2,844,474; 2,844,581, and British Pat. No. 828,052. Another form has been described in copending British Pat. No. 1,030,757.

One of the problems with attempts to treat quinacridone is that it is extremely insoluble in organic solvents. It is soluble in sulphuric acid.

I have now discovered that quinacridone is soluble in hot hexamethyl phosphor triamide the formula of which is:

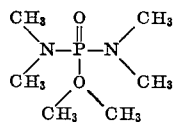

I have further surprisingly discovered that by precipitating quinacridone from its solution therein, by pouring the solution into a non-solvent, there is obtained an unexpected new crystalline form of quinacridone which possesses highly desirable properties for use as a pigment. This new form has not only excellent light fastness but is more reddish in shade than previously known forms, which is very valuable. Further it has a high tinctorial power and is extremely soft textured which is highly advantageous for ease of dispersion in the medium in which it is to be used. Moreover the texture of this new form is so fine that no grinding process is necessary.

This new crystalline quinacridone yields an X-ray diffraction pattern shown as a graph in the drawings accompanying this specification.

The quinacridone for use in our invention may be prepared by any of the procedures described in the literature. It is made most conveniently from 2,5-dianilino-3,6-dihydroterephthalate via the dihydroquinacridone or directly from 2,5-dianilinoterephthalate by ring closure. 2,5-dianilino-3,6-dihydroterephthalate is obtained by the condensation of succinylo-succinic ester (1,4-cyclohexanedione-2,5-dicarboxylate) with aniline, and 2,5-dianilinoterephthalate can be obtained therefrom by dehydrogenation. Both procedures are described e.g. by Liebermann, Liebigs Ann. Chem. 404, p. 295 (1914).

In carrying out the present invention, the crude or purified quinacridone so obtained may be dissolved in hot hexamethyl phosphoramide at a temperature above 100° C. The solution may be filtered hot if necessary. It is then poured while stirring into a cold non-solvent such as a low-boiling hydrocarbon, halogenated hydrocarbon, ether or alcohol. The best results are obtained with a low-boiling aliphatic alcohol such as methanol, ethanol, propanol or isopropanol. In hydrocarbons, halogenated hydrocarbons or ethers, the precipitation of the quinacridone is often belated, though extremely fine particles may be obtained in such solvents.

The precipitated product is then filtered, centrifuged or left settling down, whereafter it is separated from the solvent mixture. In order to remove all hexamethyl phosphoramide, the precipitate is washed several times with the solvent used for precipitation. This latter can be separated conveniently from the hexamethyl phosphoramide by distillation.

The following example illustrates the aforesaid procedure:

10.0 grams quinacridone are introduced under stirring into 800 ml. hot hexamethylphosphoramide, which is heated thereafter to 200° C. and is being kept for 15–30 minutes at this temperature, until complete solution has occurred. The solution is filtered hot. The filtrate is slowly poured into 4 litres ethanol, which are vigorously stirred. The precipitated product is left settling overnight. If the settling occurs too slowly or only to a slight extent, it can be helped considerably by warming the solution for some time to about 70° C. After settling has taken place, the clear solution is withdrawn and the dispersed product is filtered or centrifuged. The resulting pigment slurry is carefully washed with ethanol to remove all hexamethylphosphoramide. While still wet, it is introduced into a small amount of cyclohexane, and the alcohol is removed by azeotropic distillation. The remaining cyclohexane is then frozen, and the pigment is freeze-dried in a vacuum (10–20 mm. Hg). The yield of violet quinacridone pigment is 8.1 grams (=81% of the theory). The pigment obtained is extremely fine, fluffy and soft-textured.

My new pigment is valuable for colouring dopes and melts for making moulded objects, fibres, films and the like such as those made of cellulose alkylcarboxylic acid esters, and polyesters, including textiles made therefrom.

The following examples illustrate the use of my new pigment in films and fibres.

Dyed cellulose acetate film 6.89 grams of a 29% solution of secondary cellulose acetate in acetone, 19.1 ml. of acetone, 0.4 gram of the pigment and 35 grams of sand were ground together for 30 minutes. After stirring in 20 ml. of acetone the mix was filtered through orlon cloth allowed to dry on a glass plate. 0.500 gram of the dried material was dissolved in 15.9 grams of the 29% cellulose acetate solution and cast onto a glass plate and dried. The resulting maroon film had outstanding resistance to light.

Dyed cellulose acetate fibres

A pigment mix consisting of 15% by weight of the quinacridone pigment and 5% cellulose acetate by weight was ball milled in the presence of acetone. An amount of this mix was added to a fiber-forming spinning dope consisting of acetone solvent and cellulose acetate (39.4% acetyl) at a concentration of 27% to give a concentration of quinacridone pigment therein of 2% based upon the weight of the cellulose acetate. After blending the pigment mix into the spinning solution, the resulting coloured dope was dry spun in a conventional manner by extrusion through small orifices into a drying chamber to remove the solvent. Dark red to maroon fibres having excellent fastness and physical properties were obtained.

Although the invention has been described in detail with reference to preferred embodiments thereof, it will be understood that variations and modifications can be effected within the spirit of the invention.

I claim:

1. A process for the preparation of a crystalline quinacridone which comprises dissolving crude or purified quinacridone in hot hexamethyl phosphoramide at a temperature above 100° C., pouring the resulting solution into a cold non-solvent for said quinacridone, said non-solvent being selected from the class consisting of alcohols having from 1 to 3 carbon atoms, low-boiling hydrocarbons, low-boiling halogenated hydrocarbons or low-boiling ethers; thereby precipitating the crystalline quinacridone, and collecting the crystalline quinacridone.

2. The process of claim 1 wherein the pouring is done while stirring the solution and the dissolving is done at a temperature of about 100° C.

3. The process of claim 1 wherein the non-solvent is a low-boiling hydrocarbon, halogenated hydrocarbon, ether, methanol, ethanol, propanol or isopropanol.

4. The process of claim 1 wherein the solution of crude or purified quinacridone in the hot hexamethylphosphoramide is filtered while hot before pouring while stirring into the cold non-solvent.

5. The process of claim 1 wherein the precipitated crystalline quinacridone is washed several times with the non-solvent, thereby removing substantially all of the hexamethyl phosphoramide.

References Cited

UNITED STATES PATENTS 2,844,485   7/1958   Struve _____ 260—279

ALEX MAZEL, Primary Examiner

A. M. T. TIGHE, Assistant Examiner

U.S. Cl. X.R.

260—227, 40; 117—166; 8—57; 106—193